United States Patent [19]

Anderson et al.

[11] 4,143,978
[45] Mar. 13, 1979

[54] ELECTRO-MECHANICAL CIPHER MACHINE

[75] Inventors: Bern Anderson; Donald W. Seiler, both of Washington, D.C.

[73] Assignee: The United States of America as represented by the Secretary of the Navy, Washington, D.C.

[21] Appl. No.: 206,040

[22] Filed: May 4, 1938

[51] Int. Cl.$^2$ .............................................. B41J 7/68
[52] U.S. Cl. ..................................................... 400/90
[58] Field of Search ........................ 197/4; 400/89, 90

[56] References Cited

U.S. PATENT DOCUMENTS

| 1,510,441 | 9/1924 | Hebern | 197/4 |
|---|---|---|---|
| 1,540,107 | 6/1925 | Damm | 197/4 |
| 1,643,546 | 9/1927 | Damm | 197/4 |
| 2,116,731 | 5/1938 | Noll | 197/4 |
| 2,116,732 | 5/1938 | Noll | 197/4 |
| 2,116,733 | 5/1938 | Noll | 197/4 |

Primary Examiner—Stephen C. Bentley
Attorney, Agent, or Firm—John R. Utermohle

EXEMPLARY CLAIM

2. A cipher machine, comprising a plurality of rotatably mounted coding wheels each having ratchet teeth on its periphery and an annular series or uniformly spaced contacts on one face opposed to a like series on the opposite face, electrically conducting means randomly connecting each contact to a contact on the face of the wheel opposite thereto, a fixed spacer between each two of said wheels having through conductors to close the circuits between the contacts on the adjacent wheels, a plurality of type bar actuating solenoids, means operatively connecting each of said solenoids respectively to a circuit through said coding wheels and spacers, a plurality of keys, circuit means connecting each said key respectively to a circuit through said coding wheels and spacers, circuit closing means carried by each said key, a respective functional unit of operating mechanism associated with each code wheel to rotate such code wheel through the angular space of one ratchet tooth each time such unit operates, said functional units of operating mechanism being conditionable for operation or non-operation, and a common member actuatable by every key when depressed to cause operation of all said units of operating mechanism then conditioned for operation.

19 Claims, 23 Drawing Figures

Inventors
BERN ANDERSON
DONALD W. SEILER

Inventors
BERN ANDERSON
DONALD W. SEILER

BY  Ransom K. Davis
Attorney

Inventors
BERN ANDERSON
DONALD W. SEILER

BY
Attorney

Inventors
BERN ANDERSON
DONALD W. SEILER

BY
Attorney

ELECTRO-MECHANICAL CIPHER MACHINE

The invention herein described and claimed may be used and/or manufactured by or for the Government of the United States of America for governmental purposes without the payment of any royalties thereon or therefor.

This invention relates to an electrically driven machine for coding and decoding messages, such that the characters in the coded message are in purely haphazard and random sequence and hence provide a code that cannot be "broken" except by one having an identical machine with all the operating parts set to function in the same identical manner as in the machine whereby the message was coded.

Stated broadly, the principal object of this invention is to provide, in a cipher machine having a plurality of rotatably mounted wheels carrying conductors to set up random electric paths, mechanism for imparting angular movement to such wheels to shift the random paths in a reproducible haphazard manner.

A more specific object is to provide means to condition various functional units of said mechanism for operation or non-operation.

A further object is to provide means, operable by any key of the keyboard, to actuate such units as are conditioned for operation.

Another object is to provide means to transfer movement from any of said units to any other such unit, or to the same unit, to condition for operation the unit to which the movement is transferred.

A still further object is to provide operating means for the type bars whereby uniform energy is applied to each type bar regardless of the pressure exerted on the key.

An additional object is to provide switching means for selectively causing the electric current to traverse the random paths in either direction, in one for coding and in the other for decoding, and also to shunt the current around the random paths directly to the type bar operating mechanism so the machine can be used like an ordinary typewriter for writing headings and other routine matter on the messages.

The mechanical basis of the present invention is the well-known electrically operated Woodstock typewriter, modified to permit operation of the type bars by the electric means provided by this invention. Certain parts of the machine that are of well-known construction are not shown in the drawings. The type bars are caused to swing upwardly against the platen by a ratchet mechanism that engages a ratchet wheel on a shaft driven by a motor, the engagement of the ratchet mechanism with the rotating ratchet wheel being effected by depression of the proper key on the keyboard.

Figure 1:
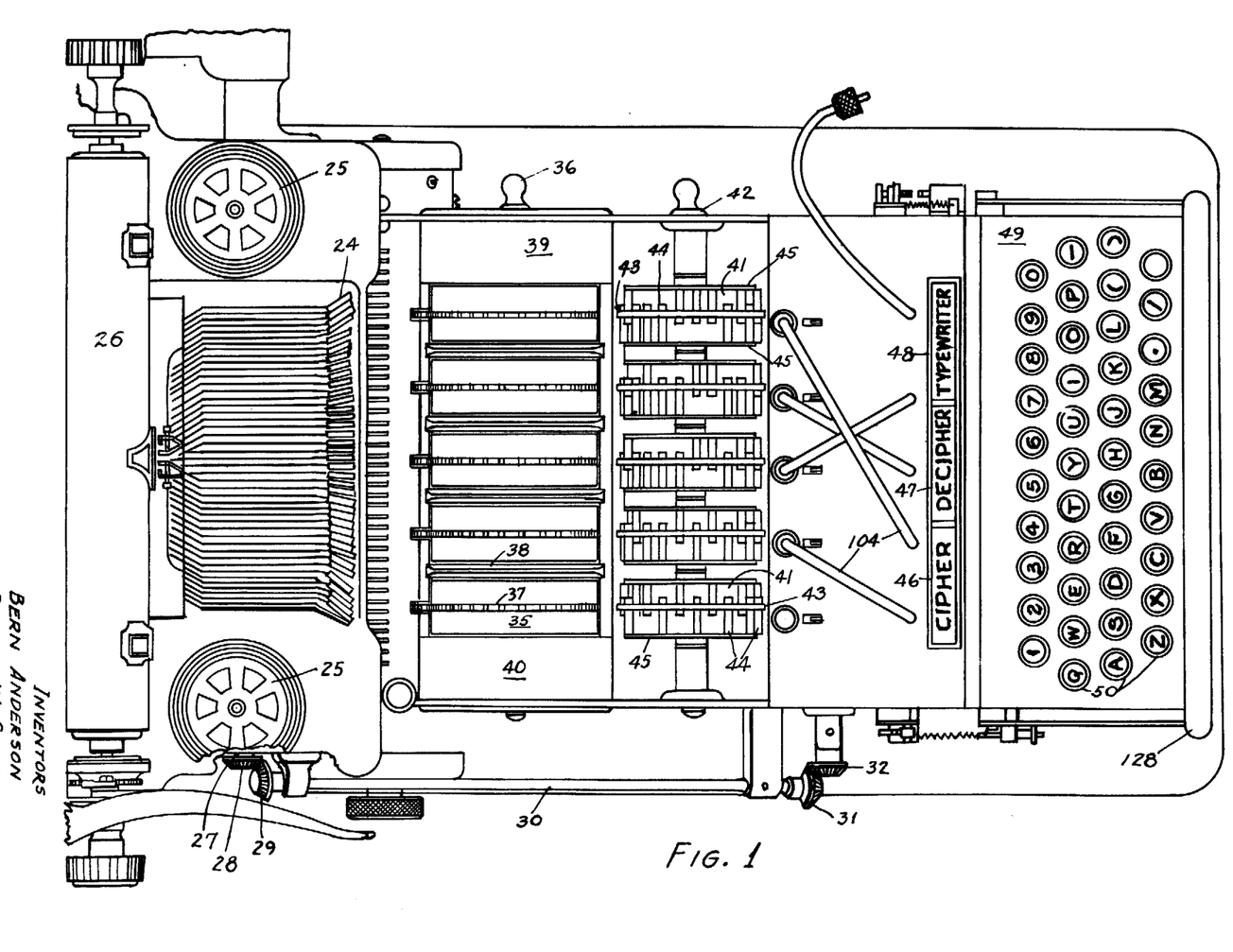
FIG. 1 is a top plan view of the entire machine.

In FIG. 1 the type bars are designated generally by the numeral 24, the spools for the ribbon being designated by 25 and the platen by 26. The shaft 27, driven by the motor as aforesaid, has fixed on it a bevel gear 28 engaged with gear 29 on shaft 30 that has at its other end a bevel gear 31 meshed with bevel gear 32 on shaft 33 (FIG. 2) whereon are secured a plurality of ratchet wheels 34 to actuate the mechanism, as will be hereinafter set forth in detail.

Still referring to FIG. 1, there are provided a plurality of coding wheels 35 rotatably mounted on a shaft 36, each of said wheels having on its periphery a series of uniformly spaced notches 37 equal in number to the number of characters to be used in coding messages, usually twenty-six, to correspond to the letters of the English alphabet. Between each two adjacent coding wheels is a spacer 38 that is mounted to remain stationary while the coding wheels are rotated. Right-hand end plate 30 and left-hand end plate 40 are likewise fixed in position and are connected to the switching means hereinafter set forth. Shaft 36 may be removed and the coding wheels 35 may be interchanged in position whereby a different series of random paths may be obtained.

Figure 4:
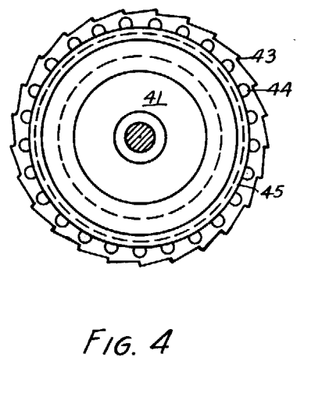
FIG. 4 is a side elevation of one of the control wheels and FIG. 5 is a plan view of the assembly of control wheels with one wheel in diametral section.
Figure 5:
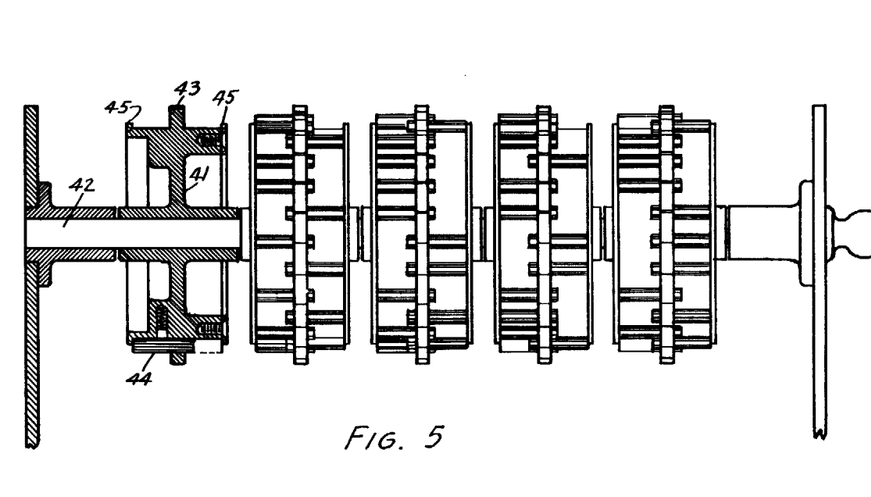
Figure 6:
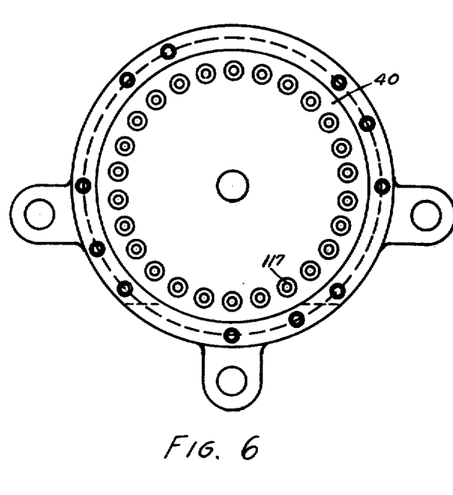
FIG. 6 is a side elevational view of the left hand end plate.
Figure 7:
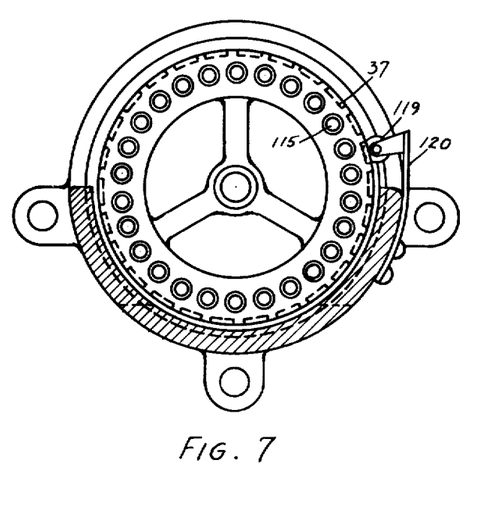
FIG. 7 is a side elevation of one of the coding wheels.

Forwardly of the coding wheels 35 are the control wheels 41 rotatably mounted on shaft 42, there being a control wheel associated with each coding wheel 35. Each control wheel 41 has a peripheral series of uniformly spaced notches 43 on a centrally disposed rib, the rib having apertures, as seen in FIG. 4, through which are slidable the pins 44 corresponding in number and position to the notches 43. The pins 44 may be slid longitudinally of themselves to project on either face of the rib and are prevented from removal from the wheel by the lateral flanges 45. There may be any suitable number of the notches 43 on the control wheel, in the present instance there are twenty-five.

Three windows respectively bearing the legends "cipher", "decipher" and "typewriter" are provided and are respectively illuminated by a lamp disposed behind each window to indicate the setting of the switch for a particular mode of operation as described by the legend on the window that is illuminated.

The keyboard 49 is of the usual type as is also the space bar 128, but the electrical connections by which these parts are made operative will be discussed in full hereinafter.

Figure 2:
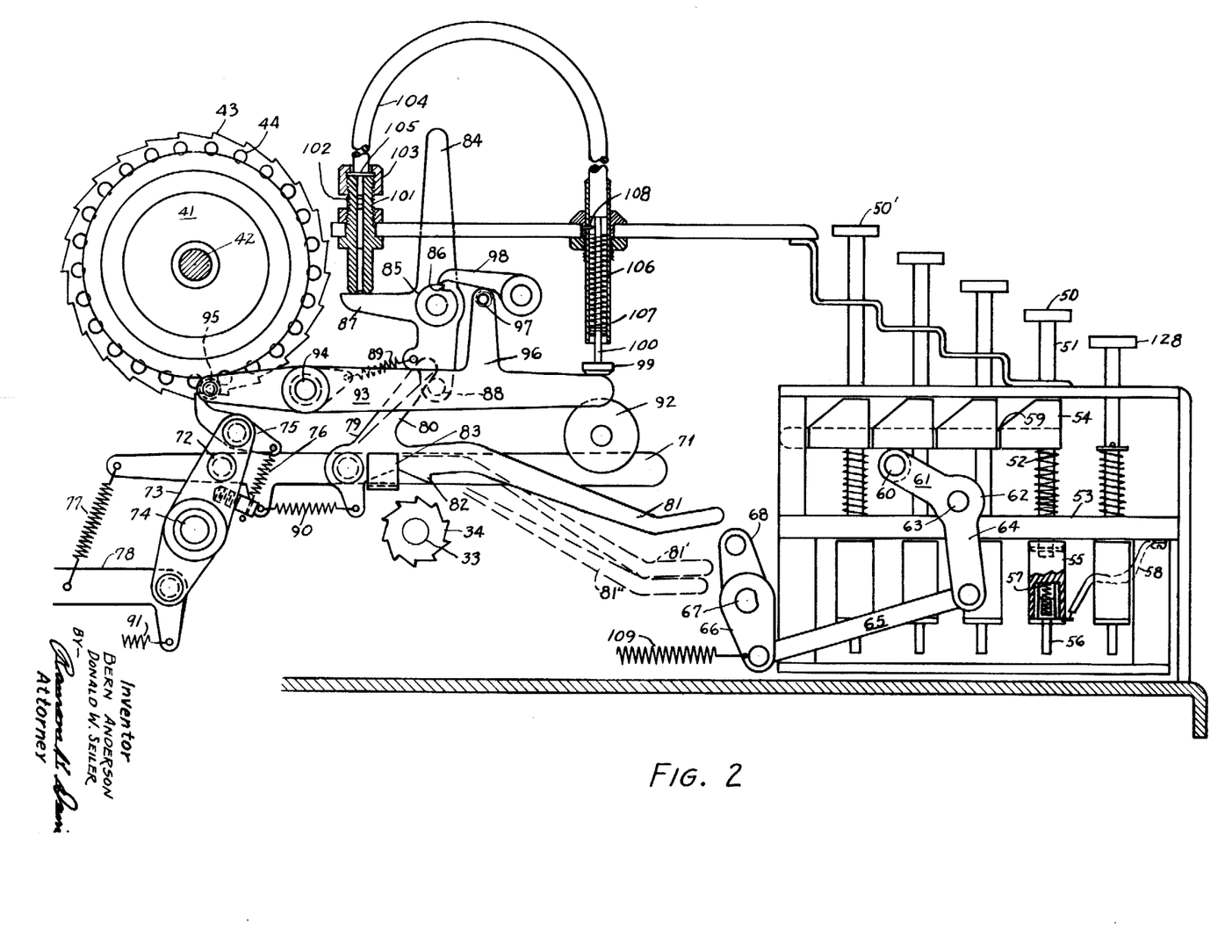
FIGS. 2 and 3 are side elevational views of the front and rear ends of the machine, respectively, the two figures taken together constituting a complete side elevational view.
Figure 9:
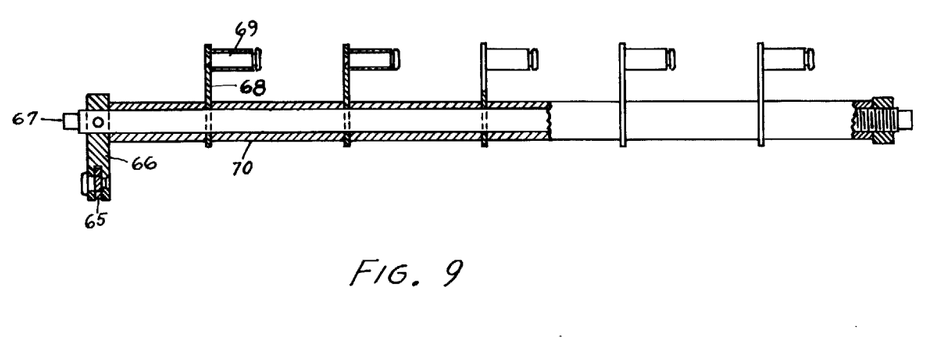
FIG. 9 is a detail view of the rocker arms for actuating the operating mechanism.
Figure 10:
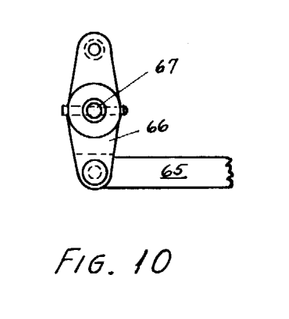
FIG. 10 is an end view, looking from the left hand end of FIG. 9.
Figure 14:
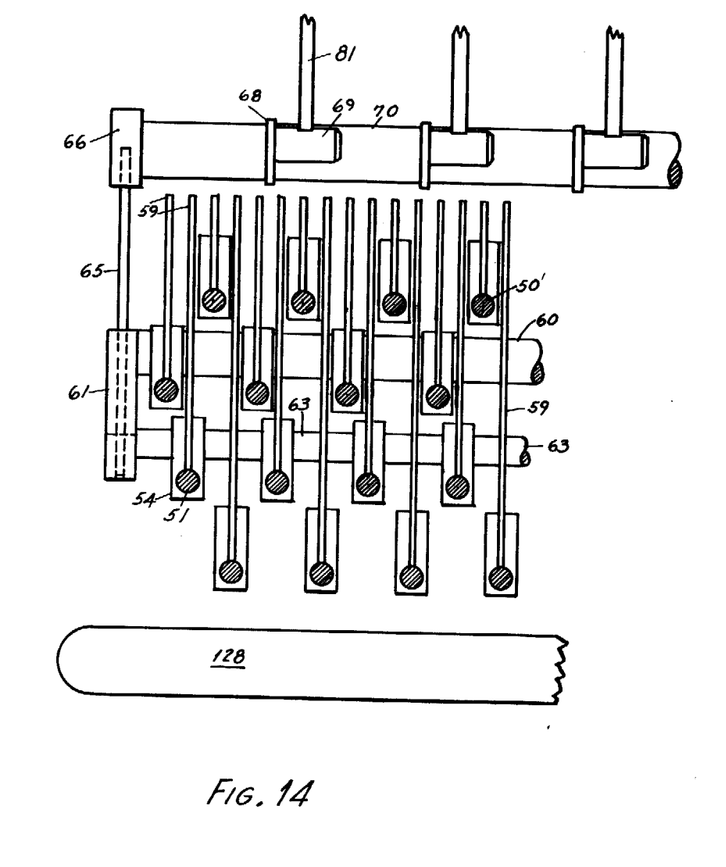
FIG. 14 is a detail view, looking from above and with certain parts cut away, showing the mechanism associated with the keys whereby the rocker arms are actuated.
Figure 15:
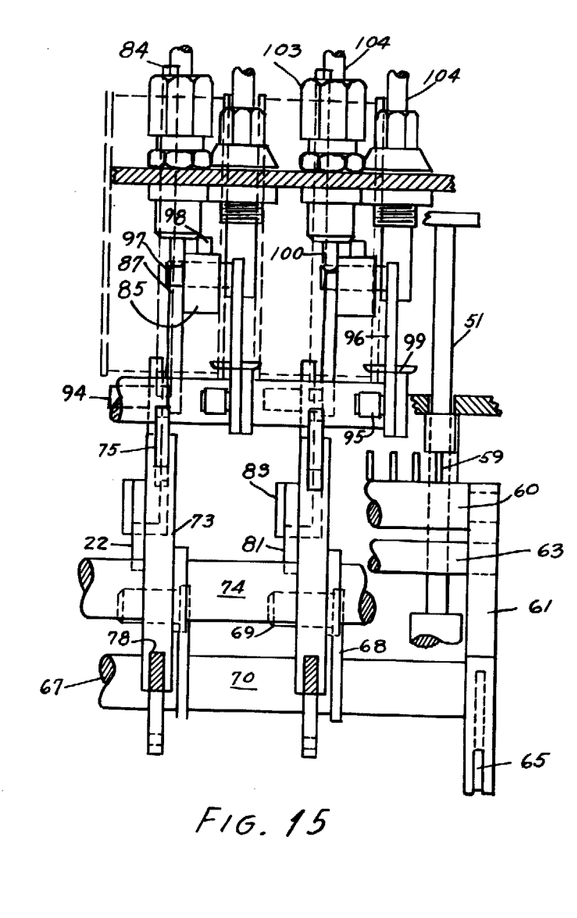
FIG. 15 is a fragmentary detail view, looking toward the front of the machine, disclosing the relation of the parts whereby movement may be transferred from one functional unit to the other.

Referring now to FIG. 2, each key of the keyboard 49 has the usual cap 50 mounted upon a shank 51 that is vertically slidable and is returned to position, after being depressed, by a spring 52 that is disposed between the fixed frame member 53 and finger base 54. Secured to each key shank 51 is a short cylindrical member 55 of insulating material in which is slidably mounted a contact member 56 urged outwardly by a spring 57, each contact member 56 being connected by a conductor 58 to a contact in switch member 121, hereinafter described, then through the switch to one of the random paths through the coding wheels, the circuit being closed when the key is depressed by the contact member 56 touching a conducting element that is insulated from the framework and is connected to source 138 of current. Fixed to each finger base 54 is a finger 59 that extends rearwardly over the bar 60 that extends across the width of the keyboard. The fingers 59 and the bar 60 are shown more clearly in FIG. 14, wherein it will be seen that the fingers 59 all terminate in a common plane, the free ends of the fingers being disposed between vertical guides (not shown) to steady the operation of the keys and fingers. The bar 60 is mounted at each end in the free end of an arm 61 of bell crank lever 62 that is rockably mounted at its elbow on a shaft 63, the free end of the other of the other arm 64 of the bell crank lever being connected to a link 65 that is likewise connected to an arm 66 secured on a shaft 67 whereon are fixed a plurality of rocker arms 68, each of which carries a laterally extending roller 69. (See also FIG. 9). The rocker arms 68 are maintained in properly spaced position by spacer sleeves 70 on shaft 67. The keys 50' are numeral keys and are operative in the "typewriter" setting only.

Associated with each control wheel 41 and its respective coding wheel 35 is a unit of operating mechanism, hereinafter termed a functional unit since all the parts of each unit cooperate to accomplish a unitary function in the actuation of the control wheel and the coding wheel controlled thereby. Inasmuch as these functional units are all similar, the description of one applies equally to all. Each unit comprises a floating bar 71 pivotally mounted at 72 adjacent its rear end on an arm 73 rockable on shaft 74, the upper free end of arm 73 carrying a pivotally mounted detent 75 that is held in ratcheting engagement with notches 43 of control wheel 41 by a spring 76. The forward end of floating bar 71 is moved upwardly by a spring 77 under tension that is engaged with the rearward end of bar 71 and with link 78 that is pivoted to the lower end of arm 73. Pivotally mounted on floating bar 71 is a bifurcated member 79 having an upwardly extending portion 80 and a forwardly extending finger 81. Adjacent the base of finger 81 is a tooth 82 engageable with the teeth on ratchet wheel 34 when the finger 81 is moved downwardly, the clip 83 fixed on floating bar 71 being contacted by the member 79 when the finger is so moved downwardly whereby the floating bar 71 is drawn down and, through engagement of tooth 82 with wheel 34, the floating bar 71 is moved rearwardly.

Setting lever 84 is pivoted at a hub 85 wherein is formed a latching notch 86 and from which the arm 87 extends laterally. At the lower end of setting lever 84 is a laterally extending roller 88 that engages the upwardly extending portion 80 on member 79 to hold finger 81 up in the full line, non-operation position when the lower end of setting lever 84 is moved rearwardly by spring 89. However, when the setting lever 84 is rocked about its pivot by pressure on arm 87, as will be hereinafter described, roller 88 is moved out of the path of upwardly extending portion 80 and the tension of spring 90 thereupon moves the finger 81 into the dotted line operating position 81' where it is engaged by the roller 69 on rocker arm 68 whenever any key is depressed to cause its finger 59 to act upon the bar 60 and thereby rock the bell crank lever 61 upon its shaft. It is apparent that such engagement of the finger 81 by the roller 69 will cause the tooth 82 to engage a ratchet wheel 34 and, since the wheel 34 is continuously rotating, the member 79 will be moved rearwardly and will carry along it the floating bar 71, thus rocking the arm 73 upon its pivot and actuating the detent 75 to rotate the control wheel 41 through the angular distance subtended by one of the notches 43. The parts are so proportioned and arranged that when the control wheel 41 has been rotated through the said angular distance the tension of spring 77, which has been increased by the upward movement of the pivot 72 during rocking of the arm 73, will disengage tooth 82 from wheel 34 and, the finger 81 being then freed from roller 69 by the backward movement of floating bar 71, the forward end of bar 71 is raised and the arm 73 together with bar 71 and the parts mounted thereon, are returned to their initial positions by spring 91. Roller 92 serves as a stop to check upward movement of floating bar 71 under the pull of spring 77.

Control lever 93, pivoted at 94, is provided at its rearward end with a roller 95 that extends laterally into the path of such of the pins 44 as are moved to the side of control wheel 41 adjacent the control lever 93, and thus each pin so extending from the adjacent face contacts roller 95 and rocks control lever 93 upon its pivot. Intermediate pivot 94 and the forward end of control lever 93 is an upwardly extending arm 96 provided at its free end with a roller 97 that is disposed to contact latch 98, which is pivoted at its forward end, and releases the free end of the latch from engagement with notch 86 in the hub 85 of setting lever 84. Bearing upon the forward end of control lever 93 is a head 99 and a flexible thrust transmitting member 100 of the type commonly known as a Bowden wire whereof the other end bears upon the arm 87 of a setting lever 84. That end of each Bowden wire 100 to which the respective head 99 is secured is permanently mounted but the opposite end thereof may be moved to bear upon the arm 87 of the setting lever 84 in any of the functional units, whereby the movement of the control lever 93 in any unit may be transferred to act upon the setting lever 84 in the same unit or in any other unit, thus greatly increasing the number of possible operating combinations. To provide for changing the position of the movable end of the Bowden wire the said movable end is disposed in a fixed tubular fitting 101 having external screw threads 102 engageable by an internally threaded union coupling 103 rotatable on the tube 104 through which the wire 100 passes, the flange 105 on tube 104 being clamped against the tubular fitting 101 by the coupling 103.

Examination of FIG. 2 shows that when the control lever 93 is rocked by contact with a pin 44 the forward end of the control lever is lifted up and imparts thrust to the wire 100 associated therewith, this thrust being transmitted to the arm 87 of a setting lever 84 to rock that setting lever about its pivot and permit the latch 98 to engage the notch 86 in the hub 85 of lever 84. While the latch 98 is thus engaged with the notch 86 the setting lever 84 is held in such position that the roller 88 thereon clears the portion 80 on the adjacent member 79 and permits the finger 81 to drop down into operating position where it is engageable by a roller 69 on a rocker arm 68 and thus so long as the latch 98 ie engaged in the notch 86 the control wheel 41 will be turned one notch each time a key is depressed. However, contact of a pin 44 with the roller 95 on control lever 93 rocks the control lever and moves the roller 97 upwardly to disengage the latch 98 from notch 86, whereupon spring 89 moves the lower end of setting lever 84 rearwardly, thereby causing the roller 88 to engage the portion 80 and lift the finger 81 up to the non-operating position, and so long as latch 98 remains thus disengaged the finger 81 cannot be contacted by a roller 69 and hence no rotation will be imparted to the control wheel 41. A spring 106 is disposed around wire 100 and is held under compression between a collar 107 and a pin 108 to urge the head 99 downwardly and thus insure that the roller 95 is returned to position to contact the pins 44.

Figure 3:
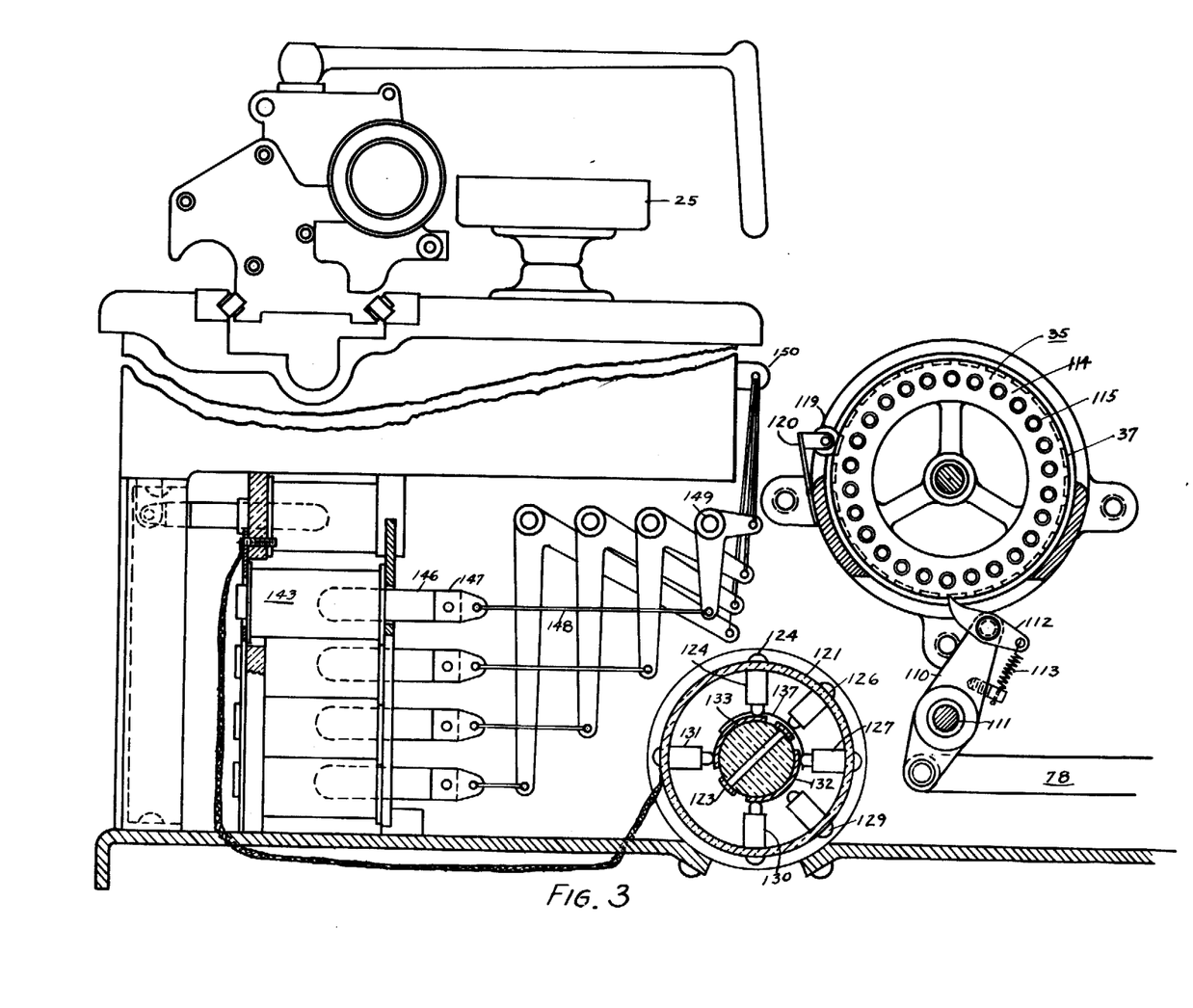

Link 78, whereof one end is connected to arm 73, is also connected to the lower end of detent arm 110 that is rockable on shaft 111 and carries at its upper end a detent 112 that is held in operating engagement with the notches 37 in the periphery of coding wheel 35 by a spring 113. It is apparent from consideration of FIGS. 2 and 3 that rearward movement of floating bar 71 causes the lower end of detent arm 73 to move forwardly and thus impart forward movement to link 78 which rocks detent arm 110 and, through detent 112, rotates the coding wheel 35 through the angular distance of one peripheral notch. The foregoing shows that rotation of a coding wheel depends upon actuation of the floating bar 71 which in turn depends not only upon the movement of a rocker arm 68 but also upon whether the latch 98 in that functional unit is engaged with or disengaged from the cooperating notch 86 and also upon the arrangement of the pins 44 in the associated control wheel 41.

Figure 8:
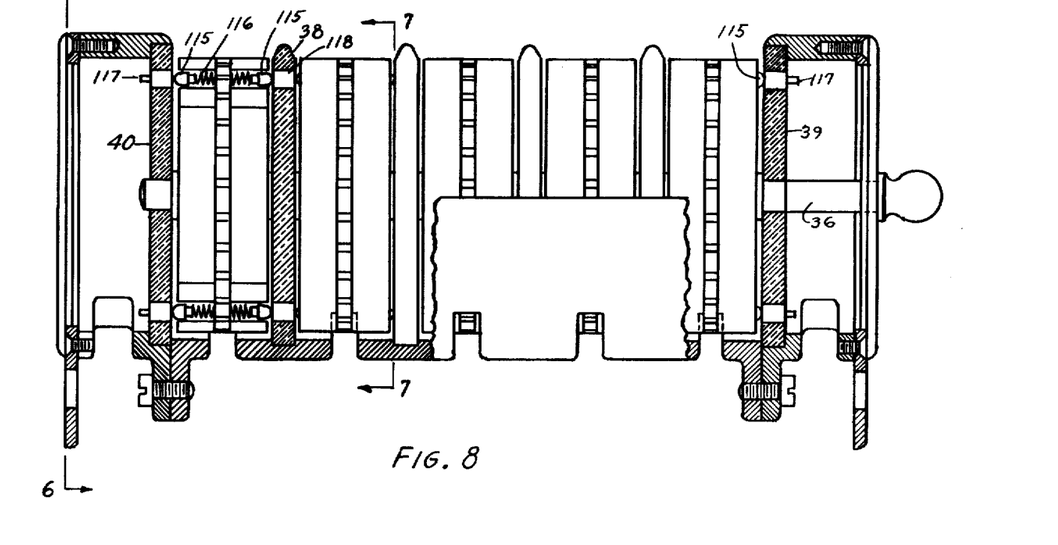
FIG. 8 is a side elevation view of the assembly of coding wheels, spacers and end plates.

Each coding wheel 35 comprises a body 114 of insulating material in each face of which are set twenty-six electrically conducting contacts 115 urged outwardly by springs 16, each contact on each face being connected in a random manner to a contact on the opposite face with the connections made differently in each coding wheel so that a different combination of circuits is produced in a manner well known in the art, as shown in FIG. 3 of the patent to Scherbins, U.S. Pat. No. 1,657,411. At the ends of the series of coding wheels are the left-hand end plate 40 and the right-hand end plate 39, each having an annular series of contact elements 117 so arranged that the contacts 117 touch a respective contact 115 to include the random paths through the coding wheels in external circuits to which the contacts 117 are connected. The spacers 38 are fixedly mounted between the coding wheels (FIG. 8) and likewise have annular series of contacts 118 to join the random paths through the coding wheels into continuous circuits, the bodies of the spacers 38 being formed of insulating material. Stopping of the coding wheels in such position that the contacts 115 will bear against the contacts 118 in the spacers or the contacts 117 in the end plates, as the case may be, is insured by providing for each coding wheel a roller 119 mounted on a spring 120 to cause the roller 119 to seat in a notch 37 on the coding wheel, thus serving as a click to bring the coding wheel to rest in the desired position. The random arrangement of the connections between the contacts 115 on opposite faces of a coding wheel is well-known in prior devices and hence is not shown in the drawing, for purpose of simplification.

Figure 11:
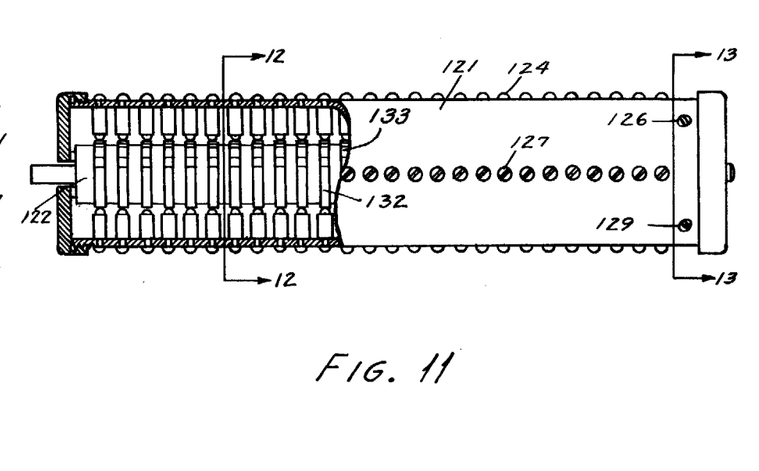
FIG. 11 is a detailed view of the switching means, partially in section and partially in elevation.
Figure 12:
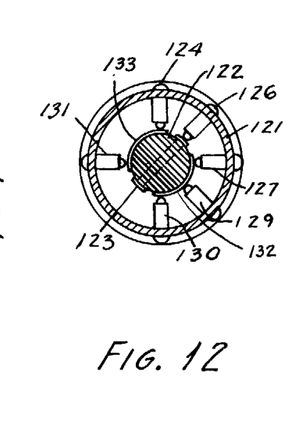
FIG. 12 is a transverse section taken on the line 12—12, FIG. 11.
Figure 21:
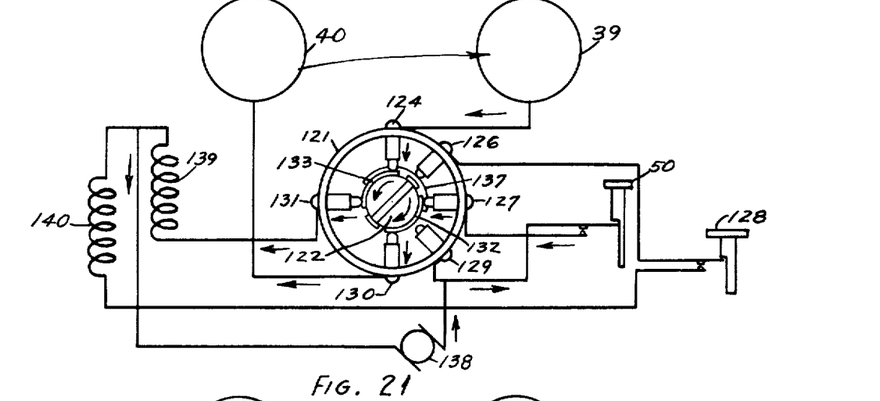
FIG. 21 shows the circuit relations existing when the switch is set for enciphering a message.
Figure 22:
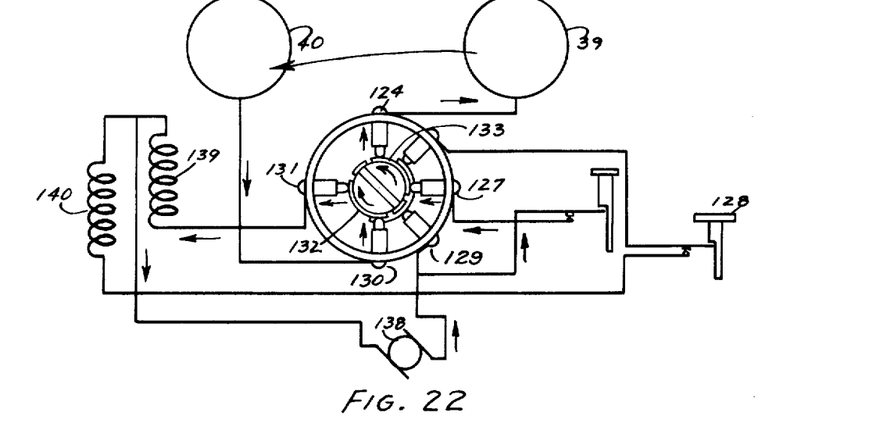
FIG. 22 shows the same parts in the deciphering position.
Figure 23:
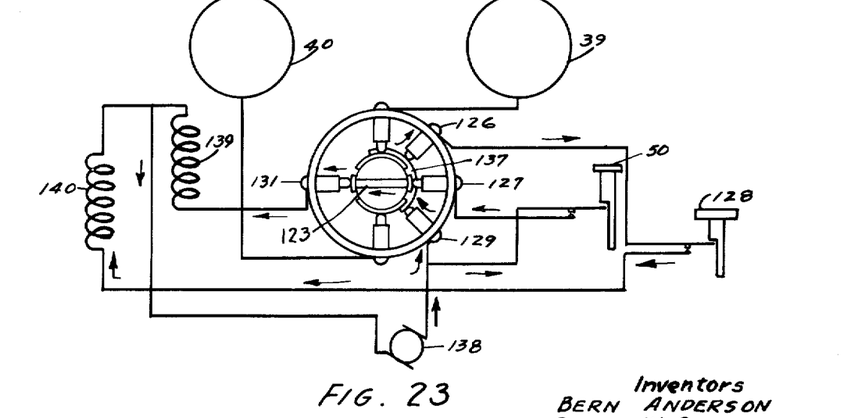
FIG. 23 shows the same parts positioned for direct energization of the type bar solenoids to permit use of the machine as an ordinary typewriter.

The switch means for setting up the circuits for coding, decoding or ordinary typewriter use is shown in FIGS. 11 and 12 and the connections thereof to the other elements in the three positions mentioned are shown in FIGS. 21 to 23. Referring now to FIG. 11 it will be seen that the switch means comprises cylindrical outer member 121 of insulating material wherein are secured a plurality of sets of contacts, all the contacts in any set having a common axial plane perpendicular to the axis of the member 121. Within the outer member is rotatably mounted an inner member 122, likewise of insulating material whereon are secured sets of conductive strips to coact with the contacts in the respective sets and also a through conducting element 123. FIG. 12 shows a set of contacts and also a set of conductive strips in side elevation, wherein the contact 124 is connected to a contact 117 on the right-hand end plate, contact 126 is connected to the circuit that is closed by depressing space bar 128, contact 127 is connected to a key 50, contact 129 is connected to a source of current, contact 130 is connected to a contact 117 in the left-hand end plate and contact 31 is connected to a type bar actuating solenoid. As shown in FIG. 12 a key is connected by contact 127 to conductive strip 132 to contact 130 whence the current flows to the left-hand end plate, then by a random path through the coding wheels and spacers to the right-hand end plate which is connected to a contact 124 in some other set of contacts whence the current flows through the coacting conductive strip 133 to a contact 131 in the said other set and thence to the type bar operating solenoid connected to the second set of contacts and back to the source of current and the key 50. At the right hand end of member 121 are contacts 126 and 129 electrically connected to space bar 128 and connected to the spacing solenoid through conductive strip 137 when the switch is set in the typewriter position, that is, when the current from the keys is shunted around the coding wheels directly to the type bar solenoids.

Figure 13:
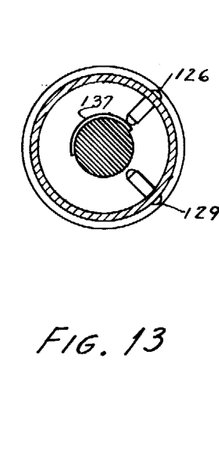
FIG. 13 is a section on the line 13—13, FIG. 11.

In FIG. 21 the setting of the switch means is that described in connection with FIGS. 12 and 13, with a diagrammatic showing of the right-hand end plate 39 connected to contact 124, left-hand end plate 40 connected to contact 130, key 50 connected to contact 127, current source 138 connected to contact 129, type bar solenoid 139 connected to contact 131 and space bar 128 connected to spacing solenoid 140 and contact 126. This is the enciphering position of the switching mechanism.

FIG. 22 depicts the deciphering setting of the switch means. Herein it will be observed that conductive strip 133 has been rotated clockwise to connect together contacts 124 and 127 and that conductive strip 132 now connects contacts 131 and 130. The path of the current is now from the key through contact 127, strip 133 and contact 124 to the right-hand end plate 39 through a random path to left-hand end plate 40, thence by way of a contact 130 in a second set of contacts, cooperating conductive strip 132 and contact 131 in the second set to type bar solenoid 139 and back to source 138. It is apparent that if the coding wheels have the same set-up in FIG 22 as in FIG. 21 the result will be exactly the opposite in the two cases. That is, suppose the A key is depressed with the parts as shown in FIG. 21 and that the circuits are such that the set of contacts through which the random path is connected to a solenoid is the set connected to the solenoid that operates the type bar for the letter T and so causes the letter T to be written in the code message. Now, with the same setting of the coding wheels but with the switching means adjusted as shown in FIG. 22 the T key is struck, then the current will go backward through the path previously traversed and will cause the letter A to be written in the deciphered message.

When it is desired to use the machine as an ordinary typewriter the switching means is set as shown in FIG. 23. Here it is seen that the path of the current from key 50 will be from the key 50 to contact 127 thence by way of through conducting element 123 to contact 131 and thence to solenoid 139 and back to source 138, the random paths in the coding wheels being shunted out. Also, the space bar 128 may be used to produce the desired spacing in the decoded message since the circuit is closed from the space bar through contact 126, conductive strip 137, contact 129, and source 138 through the spacer solenoid 140.

The construction of the type bar actuating solenoids is shown in FIGS. 17 to 20. Each solenoid comprises a substantially rectangular winding 143 wound upon a hollow form 144 that defines a substantially rectangular passage through the winding. At the base of the solenoid there are provided suitably insulated ears 145 for securing the solenoid to the frame of a machine. The core 146 is slidable in the member 144 and is provided with laterally extending stops 147 so limit the motion of the core into the solenoid, the normal position of the core being such that it is drawn into the solenoid when the coil is energized.

Returning now to FIG. 3, it will be seen that each solenoid core normally lies partially within the solenoid winding 143 and is connected by a link 148 to the long arm of a bell crank lever 149 whereof the other and shorter arm is connected to a lever 150 to cause engagement of the type bar with the driving means that causes the type bar to move against the platen, as above mentioned. It is apparent that when a winding 143 is energized due to the closing of the circuit thereto by a key 50 the core 146 will be drawn farther into the winding which will rock the bell crank lever 149 connected thereto and draw downwardly the lever 150 connected to that bell crank lever and cause the operation of the respective type bar.

Figure 16:
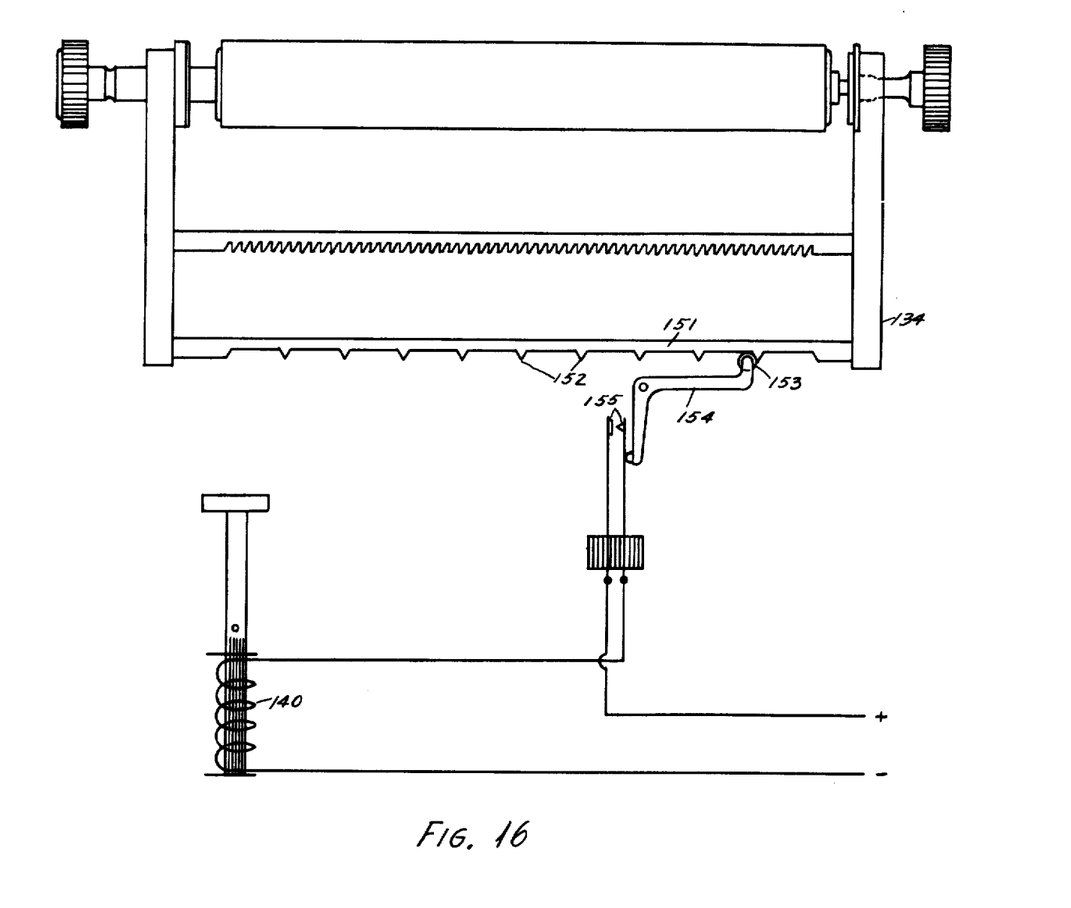
FIG. 16 is a detail view, with schematic operating circuit, of the automatic spacing means.
Figure 17:
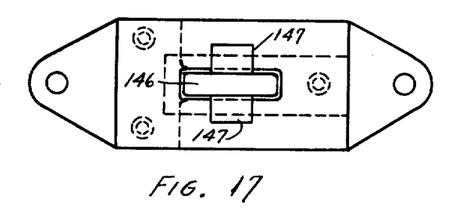
FIGS. 17 to 20 are detailed views showing the construction of the type bar operating solenoids.
Figure 18:
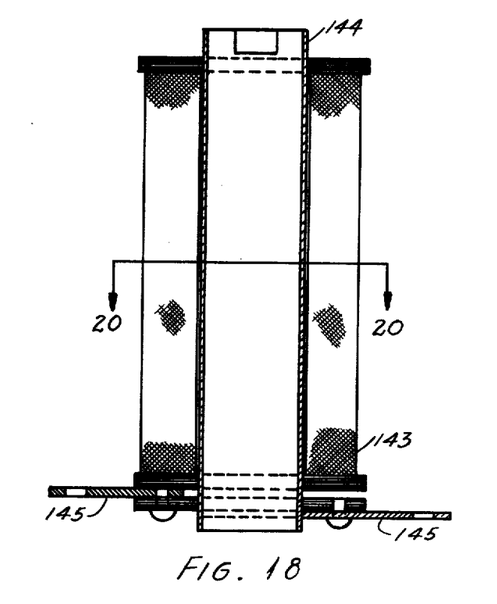
Figure 19:
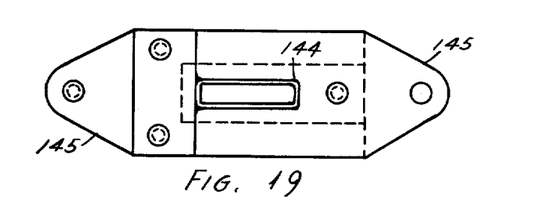
Figure 20:
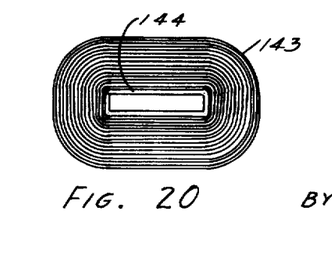

The characters in the coded message are divided into groups of five by the mechanism shown in FIG. 16. Mounted on the carriage 134 is a bar 151 having on it projections 152 that are separated from each other by distance corresponding to six letter spaces, and disposed to be engaged by the projections 152 is a roller 153 on one arm of a bell crank lever 154 whereof the other arm is disposed to close a pair of contacts 155 when the roller 153 rides up over a projection 152. Closing the contacts 155 completes a circuit to energize spacing solenoid 140 which causes the carriage to be shifted one letter space. It will thus be seen that five characters will be written in the coded message and then there will be left, automatically, a space before the next group of characters is written.

Each coding wheel 35 is designated by a distinguishing character whereby the relative position of a coding wheel having a given arrangement of the random paths between the contacts 115 on its opposite faces may be specified to enable the recipient of a message coded by our invention to make the set-up necessary for decoding, as above described. Also, the setting of the pins 44 in the control wheels 41 must be given, since a correct decoding cannot be had unless the arrangement of the machine upon which the message is coded is exactly reproduced in the machine that is to be used for decoding. In the actual construction, there is a series of indicia, preferably the letters of the alphabet. on the periphery of each coding wheel whereby the setting of each coding wheel with respect to an index on the machine may be defined. Likewise, the control wheels will each be provided with a reference mark to be set in relation to a fiducial line on the machine to serve as a basis of reference in arranging the pins 44. In addition, the connections of the Bowden wires 100 to the functional units must be known to permit of exact reproduction of the coding set-up on the decoding machine. The arrangement of the above mentioned variable elements can be specified on the coded message by a pre-arranged secret designation, or a certain set-up during specified times may be used.

The setting levers 84 are manipulated to condition the functional units of the machine for operation or non-operation at the beginning of coding or decoding a message and thereafter throughout the message the functioning of those units will be in accordance with the arrangement of the Bowden wires 100 and the disposition of pins 44 in control wheels 41. At least one of the functional units must be conditioned for operation before beginning the coding of a message and the decoding machine must have the corresponding units so conditioned before beginning decoding.

The method of operation of our invention is as follows:

A set of coding wheels 35 is assembled on shaft 36, the random circuits in each wheel preferably being differently connected from those in each other wheel of the set. For example in one wheel 35 the connection may go from the A contact 115 on one face to the P contact 115 on the other face, from B contact on one face to E contact on the other, etc., while in a second wheel the A contact on one face will be connected to L contact on the other, B on one face to H on the other face, etc. The wheels 35 are all set with respect to a fiducial line as, for example, the letters Q, I, D and Z on the respective wheels will be in registry with such line.

The pins 44 in control wheels 41 are then moved to extend on one side or the other of the control wheel in any random sequence on each wheel 41. Setting levers 84 are manually operated to engage one or more latches 98 in its cooperating notch 86 to permit the respective fingers 81 to drop down into operating position 81' and so condition the selected units for operation.

The switch is then put on "typewriter" setting (FIG. 23) and in prearranged code there is typed the information to enable an authorized recipient of the message to reproduce in his machine the code wheels 35, in their initial positions, the settings of pins 44 and the conditioning of operating units as in the machine upon which the message was coded.

The switch is then set in the "cipher" position (FIG. 21), and the keys 50 are operated just as though the message were to be typed in the ordinary manner. Suppose T is the first key struck. The current flows through the contact 127, conductive strip 132, contact 130, left hand endplate 40 and into a contact 115 in the first coding wheel 35, which contact may be the Z contact on the entering face connected to the F contact on the other face. Thence it goes through a spacer 38 to, say, the K contact in the second code wheel 35, out the R contact, through the second spacer 38 into the Y contact, out the C contact through the third spacer, into the N contact of the fourth code wheel and out the G contact to right hand end plate 39 whence it goes through contact 124, strip 133 to the type bar solenoid 139 that actuates the N type bar.

Assume the operating units for the first and third code wheels 35 to have been conditioned for operation. When the key is depressed, the bell crank lever 61 will be rocked and, through the link 65 and arm 66, the shaft 67 will be rotated to bring the respective members 69 into contact with fingers 81 of the first and third units. The respective teeth 82 will be engaged with cooperating wheels 34 and the bars 71 will be moved rearwardly to step the first and third control wheels 41 and the first and third coding wheels 35 one tooth. Assume that a pin 44 in the first control wheel 41 contacts a roller 95, rocking the lever 93, the latch 98 will be disengaged and spring 89 will move lever 84 so roller 88 will engage member 80, thus conditioning the first unit so it will not operate when the next key is struck. At the same time, the Bowden wire 100 will act upon arm 87 of a lever 84 in another unit, say the fourth, engaging the latch 98 and conditioning that unit for operation. If we assume no pin 44 in the third unit operates its coacting lever 93, then that unit will remain conditioned for operation. Whether the lever 93 is actuated or not at any particular stepping of the associated wheel 41 depends upon the setting of the pins 44 in that wheel 41.

The rotation of the code wheels 35 in the first and third units through one step each sets up an entirely different circuit so that if the T key is again depressed the letter L may be printed in the code message. That is, the A contact on the entering face of the first code wheel 35 would receive the current and that contact may be connected to the W contact on the other face and the current will flow through a wholly different circuit from the first one. Upon depression of the second key, the control wheels in the third and fourth units will be rotated one step each. Assume a pin 44 in the control wheel 41 in each of the units actuates the associated lever 93 and that the Bowden wire from the third unit actuates the lever 84 in the second unit while the Bowden wire from the fourth unit actuates the lever 84 in the third unit, then the fourth unit will be conditioned for non-operation, the first unit will be conditioned for operation and the third unit will remain conditioned for operation. It is to be understood that, due to some particular setting of the pins 44 in the several wheels 41, conditioning of from one unit to all four for operation at one time may result.

We claim:

1. A cipher machine, comprising a plurality of rotatably mounted coding wheels each having ratchet teeth on its periphery and an annular series of uniformly spaced contacts on one face opposed to a like series on the opposite face, electrically conducting means randomly connecting each contact to a contact on the face of the wheel opposite thereto, a fixed spacer between each two of said wheels having through conductors to close the circuits between the contacts on the adjacent wheels, switch means having a set of contacts each providing three electrical paths corresponding to each pair of opposed contacts on a code wheel, a type bar actuating solenoid electrically connected to each of said sets of switch means contacts, a plurality of keys each carrying electric circuit closing means, a plurality of electric circuit means each connected to a set of said switch means contacts and cooperating with one of said circuit closing means, said switch means being settable to close a circuit from each key to a solenoid in either direction through said coding wheels and spacers or directly, and means controlled by any said key when depressed to rotate one or more of said code wheels through the angular space of one ratchet tooth, in a predeterminable variable manner.

2. A cipher machine, comprising a plurality of rotatably mounted coding wheels each having ratchet teeth on its periphery and an annular series of uniformly spaced contacts on one face opposed to a like series on the opposite face, electrically conducting means randomly connecting each contact to a contact on the face of the wheel opposite thereto, a fixed spacer between each two of said wheels having through conductors to close the circuits between the contacts on the adjacent wheels, a plurality of type bar actuating solenoids, means operatively connecting each of said solenoids respectively to a circuit through said coding wheels and spacers, a plurality of keys, circuit means connecting each said key respectively to a circuit through said coding wheels and spacers, circuit closing means carried by each said key, a respective functional unit of operating mechanism associated with each code wheel to rotate such code wheel through the angular space of one ratchet tooth each time such unit operates, said functional units of operating mechanism being conditionable for operation or non-operation, and a common member actuatable by every key when depressed to cause operation of all said units of operating mechanism then conditioned for operation.

3. A cipher machine, comprising means providing a plurality of changeably random electric paths, a plurality of type bar actuating solenoids, a plurality of keys, each carrying electric circuit closing means, circuit elements disposed to be placed in closed circuit condition by the said circuit closing means on a respective key; switch means including a fixed outer member bearing a plurality of sets of contacts and a rotatable member disposed in said outer member and bearing sets of conductive strips and through conducting elements to coact with said sets of contacts on the outer member, one contact in each set being connected to one of said circuit elements, one to the circuit element connectible to the said one element by a said circuit closing means on a key and to a source of current, one to a said solenoid which is also connected to said source, one to a contact at one end of said random paths and one to a contact at the other end of said random paths, whereby said switch means may be set to connect a key through said conductive strips, to a solenoid in either direction through said random circuits or directly by a said through conducting element; and means controlled by any said key when depressed to change said random circuits in a predeterminable variable manner.

4. A cipher machine, comprising a plurality of rotatably mounted coding wheels each having ratchet teeth on its periphery and an annular series of uniformly spaced contacts on one face opposed to a like series on the opposite face, electrically conducting means randomly connecting each contact to a contact on the face of the wheel opposite thereto, a fixed spacer between each two of said wheels having through conductors to close the circuits between the contacts on the adjacent wheels; operating mechanism for each said code wheel including a rockably mounted detent engaged with said ratchet teeth to rotate the wheel when rocked, a member pivoted intermediate its ends, a link connected to one end of said member and operatively connected to said detent to rock the detent, a floating bar pivoted on said member adjacent its other end, resilient means to draw adjacent ends of said link and said bar toward each other, means to limit the movement of said adjacent ends toward each other, a member pivoted on said bar forwardly of the pivot of said bar having a forwardly extending finger and a downwardly extending tooth, resilient means tending to hold said finger in operating position, a clip on said bar engageable by said member pivoted on the bar when said finger is moved down from said operating position, a rotatable toothed wheel engageable by the said downwardly extending tooth when said finger is moved down from the operating position whereby said bar is moved rearwardly to impart rocking motion to said detent, means to hold said finger above the operating position intermittently for periods of predeterminably variable duration; a plurality of keys, means operable by any of said keys to move downwardly from the operating position any of said fingers that may be in said operating position to cause the tooth associated therewith to engage the respective toothed wheel, electric circuit means to connect each key respectively to some one of the paths through said coding wheels and spacers for any given setting of said wheels, circuit closing means carried by each key to close the said circuit connected thereto, and a solenoid respectively connected to each of the said circuits through said coding wheels and spacers.

5. A cipher machine, comprising a plurality of rotatably mounted coding wheels each having ratchet teeth on its periphery and an annular series of uniformly spaced contacts on one face opposed to a like series on the opposite face, electrically conducting means randomly connecting each contact to a contact on the face of the wheel opposite thereto, a fixed spacer between each two of said wheels having through conductors to close the circuits between the contacts on the adjacent wheels; a plurality of rotatable control wheels each having ratchet teeth on its periphery and an annular series of uniformly spaced pins that are individually laterally slidable to project on one or the other face of the wheel; operating mechanism associated with each of said control wheels including a control lever pivoted adjacent one end whereon is a roller disposed in the path of pins projecting from one face of a control wheel and has intermediate the pivot and the cther end of the lever an upwardly extending portion provided with a roller at its upper end, a setting lever pivoted intermediate its ends adjacent the roller on said portion and having a laterally projecting roller at the end of the setting lever and an arm extending laterally from the pivot point, there being a latch notch in said lever adjacent the base of said arm, a latch pivoted at one end with its other end disposed to be engageable in said notch, the said roller on the said upwardly extending portion being disposed to release said latch from said notch when said control lever is rocked by a pin on the control wheel contacting the said roller on the end of the control lever, means connecting the end of said control lever remote from the control wheel to the laterally extending arm on a setting lever whereby upward movement of said remote end of the control lever rocks the setting lever to permit said latch to engage said notch, a floating bar, a member pivoted on said floating bar and having an upwardly extending arm adapted to be contacted by the said roller on said setting lever when said latch is not in said notch and a forwardly extending finger that is held out of operating position by the action of the roller on said setting lever upon the arm of said member, means to move said finger into operating position when said latch is in said notch, a rotatable toothed wheel, a tooth on said member engageable with the teeth on said toothed wheel, whereby said member and said floating bar are moved backwardly, means connected to said bar to rotate said coding wheel and said control wheel one peripheral tooth each time said tooth on said member engages said toothed wheel; a plurality of keys, means operable by any of said keys to move downwardly any of said fingers in the operating position, electrical circuits including the paths through said coding wheels individually controlled by said keys, and type bar operating means energized by said circuits.

6. A cipher machine, comprising means providing a plurality of changeably random electric paths, a plurality of type bar actuating solenoids, a plurality of keys, each carrying electric circuit closing means, circuit elements disposed to be placed in closed circuit condition by the said circuit closing means on a respective key; a plurality of rotatable control wheels each having ratchet teeth on its periphery and an annular series of uniformly spaced pins that are individually laterally slidable to project on one or the other face of the wheel; operating mechanism associated with each of said control wheels including a control lever pivoted adjacent one end whereon is a roller disposed in the path of pins projecting from one face of a control wheel and has intermediate the pivot and the other end of the lever an upwardly extending portion provided with a roller at its upper end, a setting lever pivoted intermediate its ends adjacent the roller on said portion and having a laterally projecting roller at the end of the setting lever and an arm extending laterally from the pivot point, there being a latch notch in said lever adjacent the base of said arm, a latch pivoted at one end with its other end disposed to be engageable in said notch, the said roller on the said upwardly extending portion being disposed to release said latch from said notch when said control lever is rocked by a pin on the control wheel contacting the said roller on the end of the control lever, means connecting the end of said control lever remote from the control wheel to the laterally extending arm on a setting lever whereby upward movement of said remote end of the control lever rocks the setting lever to permit said latch to engage said notch, a floating bar, a member pivoted on said floating bar and having an upwardly extending arm adapted to be contacted by the said roller on said setting lever when said latch is not in said notch and a forwardly extending finger that is held out of operating position by the action of the roller on said setting lever upon the arm of said member, means to move said finger into operating position when said latch is in said notch, a rotatable toothed wheel, a tooth on said member engageable with the teeth on said toothed wheel, whereby said member and said floating bar are moved backwardly, means connected to said bar to rotate said control wheel one peripheral tooth each time said tooth on said member engages said toothed wheel and to actuate said random circuit means correspondingly, and a plurality of type bar operating means each individually energized by a circuit including the said circuit elements associated with a key and said random path.

7. A cipher machine, comprising a plurality of rotatably mounted control wheels each having ratchet teeth on its periphery and an annular series of uniformly spaced pins that are individually laterally slidable to project on one or the other face of the wheel; control mechanism associated with each of said wheel including a control lever pivoted adjacent one end whereon is a roller disposed in the path of pins projecting from one face of a said wheel and has intermediate the pivot and the other end of the lever an upwardly extending portion provided with a roller at its upper end, a setting lever pivoted intermediate its ends adjacent the roller on said portion and having a laterally projecting roller at its lower end and an arm projecting laterally from the pivot point, there being a latch notch in said lever adjacent the base of said arm, a latch pivoted at one end with its other end disposed to be engageable in said notch, the roller on said upwardly extending portion being disposed to release said latch from said notch when said control lever is rocked by a pin on the control wheel contacting the roller on the end of the control lever, a Bowden wire having its one end bearing upon the end of a control lever remote from the control wheel and its other end bearing upon the laterally extending arm of a selected setting lever, whereby upward movement of the said remote end of the control lever rocks the setting lever to permit said latch to engage said notch, and operating mechanism including a member that is held out of operating position by the said roller on the setting lever when said latch is not engaged in said notch and is moved into operating position when said latch is so engaged, a plurality of keys, and means controlled by any said key to effect actuation of the operating mechanism associated with any said member that is in operating position, said mechanism also including an element engageable with the ratchet teeth of the control wheel to rotate said control wheel when said mechanism is actuated.

8. A cipher machine, comprising a plurality of cooperating fixed members and movable members to establish a fixed number of changeable random paths; a control unit to control the actuation of each of said movable members, each said unit including a control wheel associated with each of said movable members having an annular series of elements selectively adjustable to project from face of said wheel; an operating mechanism operatively associated with each of said control units including means simultaneously acting to move the respective movable member and impart a predetermined rotation to the respective control wheel, a continuously operable element, means to connect said continuously operable element to said simultaneously acting means; each said control unit further including means to hold said connecting means in non-operating position, means to lock said holding means in position to permit operation of said connecting means, means selectively to transfer movement from any control unit to any control unit to condition the holding means of the unit receiving the movement for operation of the connecting means of the said movement receiving unit, means operable by said projecting elements on the wheel simultaneously to release said locking means and to actuate said movement transferring means; a plurality of keys, means operable by any said key to bring into engagement with the respective continuously operable element any said connecting means that is in operating position, and a working circuit controlled by each of said keys including one of said random paths.

9. A cipher machine, comprising means providing a definite number of changeable random electric paths, means to change said paths in a reproducibly haphazard manner, a plurality of circuits each of which includes one of said paths and a working device, a plurality of keys each provided with means for closing a respective one of said circuits; and switch means including a fixed outer member bearing a plurality of sets of contacts and a rotatable member disposed in said outer member and bearing sets of conductive strips and through conducting elements to coact with the said sets of contacts on said outer member, two of the contacts in each set being connectible by a said circuit closing means and one of the said two being also connected to a source of current, one contact in each set being connected to one end of said random path and one to the other end of the same path, and one to a said working device which is also connected to said source of current, whereby said switch means may be set to connect a key, through said conductive strips, to a working device in either direction through a random path or directly by a said through conducting element.

10. A cipher machine, comprising a plurality of cooperating fixed members and movable members to establish a fixed number of changeable random paths; a control unit to control the actuation of each of said movable members, each said unit including a control wheel associated with each of said movable members having an annular series of elements selectively adjustable to project from face of said wheel; an operating mechanism operatively associated with each of said control units including means simultaneously acting to move the respective movable member and impart a predetermined rotation to the respective control wheel, a continuously operable element, means to connect said continuously operable element to said simultaneously acting means; each said control unit further including means to hold said connecting means in non-operating position, means to lock said holding means in position to permit operation of said connecting means, means selectively to transfer movement from any control unit to any control unit to condition the holding means of the unit receiving the movement for operation of the connecting means of the said movement receiving unit, means operable by said projecting elements on the wheel simultaneously to release said locking means and to actuate said movement transferring means; a plurality of keys; means operable by any said key to bring into engagement with the respective continuously operable element any said connecting means that is in operating position, and a circuit controlled by each of said keys including a working device, a said random path, and means to cause current in said circuit selectively to traverse the random path in either direction or to pass directly to the working device without traversing the random path.

11. A cipher machine, comprising a plurality of functional units each of which includes a rotatable control wheel provided with an annular series of pins selectively slidable to project on a chosen face of the wheel, a control lever rockably mounted and provided with a roller disposed to be contacted by such of said pins as project from the said face of the wheel and projecting portion spaced from the rocking axis and on the opposite side of said axis from said roller, a setting lever rockably mounted adjacent said portion having a laterally extending arm and a notch adjacent the rocking axis, a pivoted latch disposed to have one end engageable in said notch and to be contacted by said projecting portion to disengage the latch, a Bowden wire having one end permanently mounted to bear upon the end of said control lever remote from said wheel and its other end selectively mountable to bear upon the said laterally extending arm of any setting lever whereby rocking of a control lever causes rocking of a setting lever to permit the coacting latch to engage the notch in the rocked lever, random electric path means, operating means to change said random paths in a reproducible haphazard manner and shift the control wheels, means coacting with said setting lever to hold the operating means inoperative when the respective latch is not engaged in the cooperating notch, and means to close individually circuits each of which includes one of said random paths and to actuate such of said operating means as are conditioned for operation.

12. A cipher machine, comprising a plurality of movable members each provided with random electric paths elements, means to connect each said element in each of said movable members to an element in an adjacent movable member, means to move said movable members to change the random circuits through all said members in a reproducible haphazard manner, means actuatable by instrumentalities of said last mentioned means to condition functional units of operating mechanism of said last mentioned means for operation or non-operation, working circuits corresponding in number to the random paths through said movable members and the means connecting the path elements in the same, each of said working circuits being respectively connected to one of said random paths, and means to close each of said circuits individually and simultaneously to actuate the means for moving said movable members, the movement of said movable members at any particular time being the same whichever said circuit is closed.

13. A cipher machine, comprising a plurality of movable members each provided with random electric paths elements, means to connect each said element in each of said movable members to an element in an adjacent movable member, means to move said movable members to change the random circuits through all said members in a reproducible haphazard manner, means actuatable by instrumentalities of said last mentioned means to condition functional units of said last mentioned means for operation or non-operation, working circuits corresponding in number to the random paths through said movable members and the means connecting the path elements in the same, means selectively to connect each of said working circuits respectively to one of said random paths to cause current to traverse such path in either direction or to shunt said working circuits around said random paths, and means to close each of said circuits individually and to actuate simultaneously the means for moving said movable members.

14. A cipher machine, comprising means providing a plurality of random electric paths changeable in a reproducible haphazard manner, a plurality of working circuits; switch means including a fixed outer member bearing a plurality of sets of contacts and a member rotatable in said outer member bearing sets of conductive strips and through conducting elements to coact with said sets of contacts on the outer member, one contact member in each set being connected to one end of one of said random paths, another of said contacts being connected to the other end of the same path, two other of said contact members being connected to opposite terminals of a said working circuit, and one of said two and another contact member being connectible together through a normally open circuit portion, said conductive strips coacting with said contact members to cause current to pass to said working circuit in one direction through said random path in one position of said rotatable member and through said random path in the opposite direction in another position, and said through conducting element shunting the current around said random path directly to said working circuit in a third position of said rotatable member; and means to close each circuit individually and simultaneously to change said random paths.

15. A cipher machine, comprising means providing a plurality of changeable random electric paths, means to change said paths in a reproducible sequence of irregularly intermittent intervals including a plurality of functional units of operating mechanism each having instrumentalities to condition the unit for non-operation and devices to transfer movement from any said unit to any said unit whereby the unit to which the movement is transferred is conditioned for operation, a plurality of circuits each including one of said paths, and means to close each of said circuits individually and simultaneously to actuate said path changing means, the change in said path at any particular time being the same whichever circuit is closed.

16. A cipher machine, comprising means providing a plurality of changeable random electric paths, means to change said paths in a reproducible sequence of irregularly intermittent intervals including a plurality of functional units of operating mechanism each having instrumentalities to condition the unit for non-operation and devices to transfer movement from any said unit to said unit whereby the unit to which the movement is transferred is conditioned for operation, a plurality of circuits each including one of said paths, means to close each of said circuits individually and simultaneously to actuate said path changing means, and means selectively adjustable to connect said random paths into said circuits to cause current to traverse said paths in either direction or to shunt said current around said random paths.

17. A device of the class described, comprising a plurality of juxtaposed movable members each provided with a plurality of random circuit elements, means to connect each said element in each said member to a said element in an adjacent said member to constitute as many circuits through all said members as there are circuit elements in any one member, a respective mechanical functional unit operative to move each said member by equal increments, each said unit being conditionable for operation or non-operation, means actuatable by operation of one of said units to condition another said unit for operation, a plurality of keys, means actuatable by every said key to effect operation of all units conditioned for operation, and working instrumentalities equal in number to said random circuits, each said instrumentality being connected to a said circuit through all said members.

18. In a device according to claim 17, each of said respective mechanical functional units including a setting lever having means for manual setting thereof to condition the mechanical functional unit for operation.

19. In a device according to claim 17, said means actuatable by operation of one of said units to condition another said unit for operation also being actuatable to condition the same unit for operation.

* * * * *